3,517,255
FLASH APPARATUS WITH AUTOMATIC LIGHT TERMINATION USING LIGHT ACTIVATED SILICON CONTROLLED RECTIFIER
Jerry B. Hoffer and Francis T. Ogawa, Denver, and Robert H. Wallace, Littleton, Colo., assignors to Honeywell, Inc., Minneapolis, Minn., a corporation of Delaware
Filed July 25, 1968, Ser. No. 747,628
Int. Cl. G01j 1/32; H05b 41/32, 41/38
U.S. Cl. 315—151                                   4 Claims

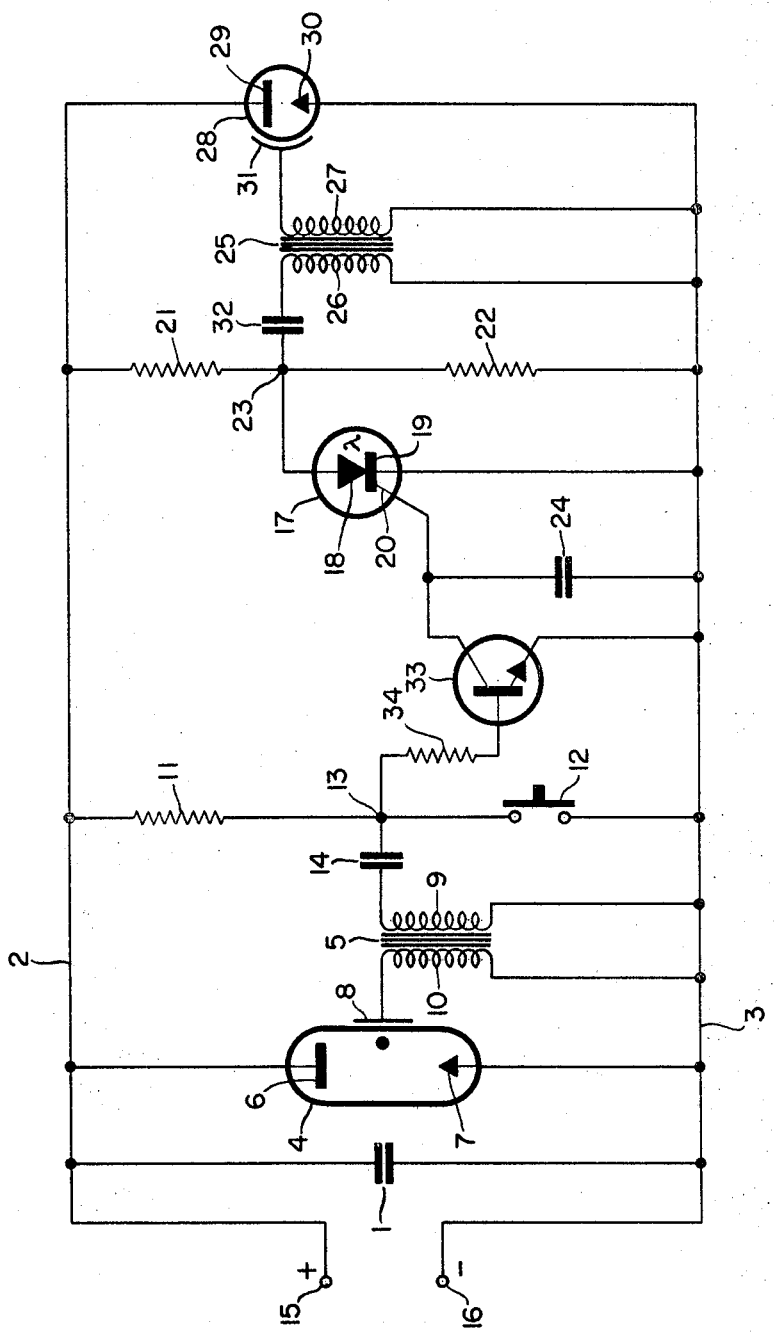

ABSTRACT OF THE DISCLOSURE

Subsequent to the firing of the flash tube of the apparatus, a light activated silicon controlled rectifier, exposed to the resulting light, charges an integrating capacitor connected between its gate and cathode until the rectifier becomes conductive coincident with having received a predetermined total quantity of light. A trigger transformer coupled to the rectifier anode then produces a pulse which fires a quench tube, connected in parallel with the flash tube, to terminate the light. A transistor resetting switch, normally short-circuiting the capacitor, is opened when the flash tube is fired, and is reclosed subsequent to the production of the pulse.

---

Subject matter disclosed but not claimed herein is disclosed and claimed in the copending application of Francis T. Ogawa, S.N. 747,714.

Electronic photographic flash devices are known in the art in which the flash produced by the flash tube is automatically terminated as soon as a predetermined total quantity of light has been received from the photographed scene by a light responsive control portion of the device. Such devices are shown, for example, in U.S. Pats. No. 3,340,426, No. 3,350,603, and No. 3,350,604. While such devices have been generally satisfactory, there has still existed a need for an improved device of this type wherein the light responsive control portion for sensing and automatically terminating the light, is simpler in construction, smaller in size, lighter in weight, lower in cost, and even more reliable in operation than in the previously known devices.

Accordingly, it is an object of the present invention to provide an improved flash apparatus which fulfills the foregoing need. It is another object of the invention to provide such improved apparatus which requires significantly fewer components and simpler circuitry than have been required in the previously known devices, but which nevertheless operates even more efficiently and reliably than does the previously known apparatus.

In accomplishing these and other equally desirable objects, the improved flash apparatus provided in accordance with the present invention includes in its control portion a light activated silicon controlled rectifier which, together with a capacitor, serves as a combination light sensing, light integrating, and trigger actuating means. The rectifier circuit is advantageously energized from the power supply for the flash tube of the apparatus, thereby further simplifying the apparatus construction. The rectifier is exposed to light coming from a scene which is to be photographed and which is illuminated by the light produced by the flash tube. When the receifier has been exposed to a predetermined total quantity of light, the capacitor becomes charged to a value at which it causes the rectifier to become conductive. This causes a pulse to be produced. This pulse is used to terminate the light, as by firing a quench tube which parallels the flash tube. A resetting device, shown as a transistor switch, effectively discharges the capacitor subsequent to the production of the pulse, thereby readying the circuit for the next integration.

At better understanding of the present invention may be had from the following detailed description when read in connection with the accompanying drawing, in which the single figure is a schematic circuit diagram of improved flash apparatus according to the present invention.

Referring to the circuit diagram of the drawing, the illustrated and described flash apparatus is one which includes the conventional type of electronic flash tube and firing circuit therefor, together with a novel light responsive control portion for automatically terminating the production of light by said tube when a predetermined total quantity of light has been received back by the apparatus. Thus, the apparatus is one which automatically controls the duration of the flash produced by the flash tube as necessary to cause a predetermined total quantity of light to fall on the film of an associated camera, not shown, from a scene being photographed. The illustrated apparatus includes the usual flash storage capacitor 1 which is connected between conductors 2 and 3, and includes the usual flash tube 4 and trigger transformer 5. The flash tube 4 has main electrodes 6 and 7 which are connected, respectively, to the conductors 2 and 3, and has a trigger electrode 8. The transformer 5 has a primary winding 9 and a secondary winding 10.

A resistor 11 and a normally open firing switch 12 are connected in series between the conductors 2 and 3, and have a common junction 13. The switch 12 is representative of the usual camera shutter flash contacts and/or open flash or test switch of the flash apparatus. The winding 9 is connected in series with a trigger capacitor 14 between the junction 13 and the conductor 3, and hence across the switch 12. The winding 10 is connected between the electrode 8 and the conductor 3. The conductors 2 and 3 are provided with respective terminals 15 and 16 for connecting these conductors, and hence the capacitor 1, to the usual capacitor charging means, not shown. As shown, conductor 2 is positive with respect to conductor 3.

The construction and operation of the apparatus as thus far described are those of a typical electronic flash device, of the type shown and described in U.S. Pat. No. 3,049,611, for example. It is therefore sufficient to note herein, with respect to such operation, that the capacitor 1 is normally maintained in a charged state by the aforementioned capacitor charging means, whereby a relatively high voltage is normally maintained between the conductors 2 and 3. The capacitor 14 also is normally maintained charged, by virtue of its connection to the conductors 2 and 3 through the resistor 11 and winding 9.

When the flash tube 4 is to be fired, the switch 12 is closed. This dumps the charge on the capacitor 14 across the winding 9, with the result that a trigger pulse is applied between the electrodes 8 and 7. This fires the tube 4 and causes it to conduct and to emit light. In the absence of the automatic control portion of the apparatus, to be described hereinafter, the tube 4 will continue to emit light until, due to the conduction of the tube 4, the charge on the capacitor 1, and the voltage between the conductors 2 and 3, drop sufficiently to cause the tube 4 to be extinguished. Thereafter, the capacitors 1 and 14 are recharged to be ready for the next firing of the tube 4.

The novel control portion of the apparatus includes a light activated silicon controlled rectifier (LASCR) 17 which is arranged to be exposed to light coming from the scene which is to be illuminated by the flash tube and which is to be photographed. The LASCR has an anode 18, a cathode 19, and a gate 20. Two resistors, 21 and 22, are connected in series between the conductors 2 and 3, and have a common junction 23. The anode 18 is connected to the junction 23, and the cathode 19 is connected to the conductor 3, whereby the anode-cathode path of the LASCR 17 is connected across the resistor 22. An integrating capacitor 24 is connected between the gate 20 and the conductor 3, whereby the capacitor 24 is connected between the gate 20 and the cathode 19.

Said control portion also includes a quench trigger transformer 25 having a primary winding 26 and a secondary winding 27, and includes a quench tube 28 having main electrodes 29 and 30 and a trigger electrode 31. The tube 28 may well be of the type described in the three patents first mentioned herein. The winding 26 is connected in series with a trigger capacitor 32 between the junction 23 and the conductor 3, whereby this winding and capacitor are connected in series across the resistor 22 and a charge is normally maintained on the capacitor 32. The winding 27 is connected between the electrode 31 and the conductor 3. The electrodes 29 and 30 are connected, respectively, to the conductors 2 and 3, whereby the quench tube 28 is directly connected in parallel with the flash tube 4 between the conductors 2 and 3.

An NPN transistor 33, having the usual collector, emitter, and base, forms a resetting switch for the capacitor 24. To this end, the collector of the transistor 33 is connected to the upper side of the capacitor 24, while the transistor emitter is connected to the conductor 3. This places the collector-emitter path of the transistor 33 across the capacitor 24. The transistor base is connected through a resistor 34 to the junction 13, whereby the base-emitter path of the transistor is connected in series with the resistors 11 and 34 between the conductors 2 and 3, and is connected in series with the resistor 34 across the switch 12.

The apparatus which has just been described operates in the following manner. Let it be assumed that the capacitor 1 has its normal operating charge, and that the apparatus is thus in condition to fire the flash tube 4 upon the closure of the switch 12. At this time, the tubes 4 and 28, and the LASCR 17, are not conducting. Also at this time, the voltage between the conductors 2 and 3 produces such a base bias on the transistor 33 that the latter is turned on, causing its collector-emitter path effectively to short-circuit the capacitor 24. The gate 20 of the LASCR 17 is thus effectively clamped to the cathode 19, and the LASCR 17 is held off or non-conductive.

When the switch 12 is subsequently closed, thereby firing the flash tube 4, the base-emitter path of the transistor 33 is effectively short-circuited, thereby removing the aforementioned base bias from the transistor. This turns off the transistor and removes the aforementioned short-circuit from across the capacitor 24. The following reopening of the switch 12, which usually occurs almost at once, does not cause the capacitor 24 to be short-circuited again however, since the conduction of the tube 4 will have by then so reduced the charge on the capacitor 1, and the voltage between the conductors 2 and 3, that there will then be insufficient base bias on the transistor 33 to turn it on to effect such short-circuiting of the capacitor 24.

Coincident with the foregoing action, the LASCR 17 will start to receive light from the scene as a result of the operation of the flash tube 4. This light falls on the photo-sensitive junction of the LASCR 17 and causes the latter to generate a photo current which is proportional to the intensity of the incident light and which charges the capacitor 24 in accordance with the equation:

$$V = \frac{1}{C}\int i\,dt$$

where:
V is the voltage across the capacitor 24,
C is the capacitance of the capacitor 24, and
$i$ is the photo current generated in the LASCR 17.

In other words, the charge and voltage on the capacitor 24 are proportional to the integral of the intensity of the light incident on the LASCR 17 from the time of the turning off of the transistor 33.

As the light continues to fall on the LASCR 17, the total quantity of light to which the LASCR has been exposed increases, as does the charge on, and the voltage across, the capacitor 24. As soon as this capacitor voltage, which appears, of course, between the gate 20 and cathode 19, exceeds the gate trigger voltage of the LASCR, the latter is turned on and switches to a conductive state. The time at which this switching on of the LASCR occurs is the time at which the LASCR has been exposed to a certain total quantity of light. By the proper selection of component values, this total quantity of received light, at which the LASCR becomes conductive, can be made to be a desirable predetermined total quantity, related to the illumination requirements for providing a suitable photograph.

The switching of the LASCR 17 to a conductive state causes the anode-cathode path of the LASCR to effectively short-circuit the resistor 22 and to dump the charge on the capacitor 32 across the winding 26 of the quench trigger transformer 25. This in turn causes a trigger pulse to be applied between the electrodes 31 and 30 of the quench tube 28. This fires the latter, causing it to effectively short-circuit the flash tube 4 and terminate the production of light by the latter. Thus, the total quantity of light produced by the flash tube 4 is held at the value corresponding to said desired predetermined total quantity of light which switched the LASCR 17.

The aforementioned dumping of the capacitor charge across the winding 26 produces a ringing action, which back-biases the LASCR 17 and positively turns it off once it has caused the trigger pulse to be produced. Thus, the LASCR 17 is returned to its normal, non-conductive state, ready for the next flash-controlling operation.

Subsequent to the quenching of the flash tube 4, the voltage between the conductors 2 and 3 rises sufficiently, as the capacitor 1 is recharged, to return the turn-on base bias to the transistor 33. Therefore, subsequent to the production of the trigger pulse, the transistor 33 is again turned on, whereby it then resets the capacitor 24 by effectively short-circuiting and discharging it, thereby readying the circuit for the next integrating operation.

It will be appreciated that the described operation of the transistor 33 also provides a desirable gating action, whereby the LASCR 17 is prevented from starting its light integrating function until the flash tube 4 has actually been fired. Novel automatic flash apparatus embodying this gate feature, which prevents extraneous conditions from actuating the light controlling circuitry, is the subject of the aforementioned copending application.

It should be appreciated further that the novel light responsive control circuitry of the present invention can be used advantageously with flash devices other than electronic flash tubes, such as flash bulb apparatus equipped with means for terminating the flash light by interrupting its passage from the device in response to a trigger pulse. Examples of such apparatus are the arrangements disclosed in the copending applications of W. H. Owens, Ser. No. 700,998, and D. G. Taylor, Ser. No. 704,597.

Further, it should be appreciated that said novel circuitry can be used advantageously with flash apparatus wherein pulse-actuated terminating means terminates the light by interrupting its passage to the photographic film, as by the use of a shutter, instead of by stopping the production of the light by the flash device or by interrupting the passage of the light from the flash device.

In conclusion, it is seen that the improved apparatus according to the present invention, by virtue of the use of the LASCR and the associated circuitry, is of relatively simple construction with respect to the previously known arrangements of this type, having fewer components and simpler circuitry, and not requiring a separate power source for the light responsive control portion.

The embodiments of the invention in which an exclusive property or privilege is claimed are defined as follows:

1. In apparatus including a flash device and means for firing the latter to cause it to produce light, the improved light responsive control means for controlling said light comprising
 light sensitive trigger circuit means including
  a light activated silicon controlled rectifier arranged for exposure to said light, and
  an integrating capacitor connected to said rectifier to attain a predetermined charge, to cause said trigger circuit means to produce a pulse, when said rectifier has been exposed to a predetermined total quantity of light,
 terminating means connected to said trigger circuit means to terminate said light upon the production of said pulse, and
 resetting means connected to said trigger circuit means to effectively discharge said capacitor subsequent to the production of said pulse.

2. Apparatus as specified in claim 1 wherein
 said rectifier has an anode and a cathode connected across a source of energizing voltage, and has a gate,
 said capacitor is connected between said gate and said cathode to be charged in accordance with said total quantity of light and to switch said rectifier to a conductive state when the charge on said capacitor reaches said predetermined value as a result of the exposure of said rectifier to said predetermined total quantity of light,
 said trigger circuit means includes coupling means connected to said anode to produce said trigger pulse when said rectifier switches to said conductive state,
 said flash device includes an electronic flash tube,
 said terminating means includes a quench tube having main electrodes connected across said flash tube and having a trigger electrode connected to said coupling means to cause said trigger pulse to fire said quench tube to effectively short-circuit said flash tube, and wherein
 said resetting means is connected across said capacitor.

3. Apparatus as specified in claim 2, wherein said resetting means includes a normally conductive transistor which is connected across said capacitor to normally effectively short-circuit the latter, and which is made nonconductive upon the firing of said flash tube.

4. Apparatus as specified in claim 2, wherein said flash tube is connected across said source of energizing voltage.

References Cited
UNITED STATES PATENTS

| | | | |
|---|---|---|---|
| 3,033,988 | 5/1962 | Edgerton | 250—205 |
| 3,340,426 | 9/1967 | Elliott | 315—151 |
| 3,350,603 | 10/1967 | Erickson | 315—157 X |

JAMES W. LAWRENCE, Primary Examiner

C. R. CAMPBELL, Assistant Examiner

U.S. Cl. X.R.

250—205; 315—157, 159, 183, 230, 241